United States Patent
de Souza et al.

(10) Patent No.: US 11,466,229 B2
(45) Date of Patent: Oct. 11, 2022

(54) METHODS FOR BLEACHING PHOSPHOLIPID COMPOSITIONS

(71) Applicant: Bunge Global Innovation, LLC, White Plains, NY (US)

(72) Inventors: Jean Ricardo de Souza, Gaspar (BR); Rogerio Pereira Machado, Blumenau (BR)

(73) Assignee: Bunge Global Innovation, LLC, Chesterfield, MO (US)

( * ) Notice: Subject to any disclaimer, the term of this patent is extended or adjusted under 35 U.S.C. 154(b) by 448 days.

(21) Appl. No.: 16/292,898

(22) Filed: Mar. 5, 2019

(65) Prior Publication Data
US 2019/0276766 A1   Sep. 12, 2019

Related U.S. Application Data

(60) Provisional application No. 62/639,048, filed on Mar. 6, 2018.

(51) Int. Cl.
| | | |
|---|---|---|
| *C11B 3/00* | (2006.01) | |
| *A23L 5/40* | (2016.01) | |
| *A23D 9/02* | (2006.01) | |
| *B01J 19/12* | (2006.01) | |

(52) U.S. Cl.
CPC .............. *C11B 3/005* (2013.01); *A23D 9/02* (2013.01); *A23L 5/40* (2016.08); *C11B 3/001* (2013.01); *C11B 3/006* (2013.01); *B01J 19/123* (2013.01)

(58) Field of Classification Search
CPC ......... C11B 3/005; C11B 3/001; C11B 3/006; A23L 5/40; A23L 5/49; A23D 9/02; B01J 19/123

USPC ..................................................... 204/157.73
See application file for complete search history.

(56) References Cited

U.S. PATENT DOCUMENTS

| | | | | | |
|---|---|---|---|---|---|
| 1,386,476 | A | * | 8/1921 | Wall ................. | C11B 3/005 204/157.87 |
| 3,585,116 | A | * | 6/1971 | Logan et al. ....... | B01J 19/123 204/157.78 |
| 3,668,091 | A | * | 6/1972 | French ............... | B01J 19/123 204/157.87 |

(Continued)

FOREIGN PATENT DOCUMENTS

| | | |
|---|---|---|
| CN | 101731448 A | 6/2010 |
| CN | 103141663 A | 6/2013 |

(Continued)

OTHER PUBLICATIONS

Memoli et al, "Studies of Differently Induced Peroxidation Phenomena in Lecithins," J. Agric. Food Chem. 1996, vol. 44, pp. 2814-2817 (Year: 1996).*

(Continued)

*Primary Examiner* — Nicholas A Smith
(74) *Attorney, Agent, or Firm* — Armstrong Teasdale LLP

(57) ABSTRACT

Methods for reducing the color of phospholipid compositions comprising lecithin are disclosed. The phospholipid composition is exposed to ultraviolet light to reduce the color of the composition. The phospholipid composition may be diluted and/or heated prior to exposure to ultraviolet light to improve the flow properties of the composition. The phospholipid composition may be cooled and/or concentrated after color reduction.

20 Claims, 4 Drawing Sheets

(56) References Cited

U.S. PATENT DOCUMENTS

| | | | |
|---|---|---|---|
| 3,668,092 A * | 6/1972 | French | B01J 19/123 204/157.87 |
| 4,528,201 A | 7/1985 | Purves | |
| 6,172,248 B1 * | 1/2001 | Copeland | A23D 9/00 554/190 |
| 8,232,418 B1 | 7/2012 | Bilbie et al. | |
| 2013/0131362 A1 * | 5/2013 | Diego Ferres Dellapiani | C11B 1/108 554/83 |
| 2015/0001163 A1 * | 1/2015 | Abe | B01J 19/123 210/739 |
| 2018/0201635 A1 * | 7/2018 | Kurth | C08L 91/00 |

FOREIGN PATENT DOCUMENTS

| | | | | |
|---|---|---|---|---|
| CN | 104711112 A | | 6/2015 | |
| CN | 104782795 A | | 7/2015 | |
| CN | 105132125 A | | 12/2015 | |
| GB | 191012947 A | * | 4/1911 | C11B 3/005 |
| GB | 537682 A | * | 7/1941 | C11B 3/005 |
| GB | 1272852 | * | 5/1972 | |
| WO | 2017033674 A1 | | 3/2017 | |
| WO | 2018031569 A1 | | 2/2018 | |

OTHER PUBLICATIONS

Jain et al, "Effect of the Degree of Processing on Soy Oil Conjugated Linoleic Acid Yields," J. Agric. Food Chem. 2008, 56, 8174-8178 (Year: 2008).*

Inaba et al., "Alcohol-extracted soy-bean oil. II. Changes of properties and compositions by ultra-violet light," Journal of the Society of Chemical Industry, Japan [Kogyo Kagaku Zasshi] vol. 37, No. 7, pp. 372-374 (1934) (Year: 1934).*

Derwent Abstract for CN 107812030 A (Year: 2018).*

Cvetkovic et al., "Effects of continuous UV-irradiation on the antioxidant activities of quercetin and rutin in solution in the presence of lecithin as the protective target", J. Serv. Chem. Soc., 2011, vol. 76, No. 7, pp. 973-985.

Grosh et al., "Edible Fats and Oils", Food Chemistry, Dec. 2008, pp. 640-666.

Scholfield et al., "Sources of Color in Soybean Lecithin", The Journal of the American Oil Chemists' Society, Jun. 1954, vol. 31, pp. 258-261.

International Search Report and Written Opinion for PCT/US2019/020689, dated Jun. 26, 2019, 15 pages.

* cited by examiner

METHODS FOR BLEACHING PHOSPHOLIPID COMPOSITIONS

CROSS-REFERENCE TO RELATED APPLICATION

This application claims the benefit of U.S. Provisional Patent Application No. 62/639,048, filed Mar. 6, 2018, which is incorporated herein by reference in its entirety.

FIELD OF THE DISCLOSURE

The field of the disclosure relates to methods for preparing phospholipid compositions that comprise lecithin and, in particular, methods for producing phospholipid compositions with reduced color.

BACKGROUND

Lecithin is a mixture of phospholipids (which may also be referred to as "phosphatides") that is typically extracted from egg yolks, other animal sources (e.g., membranes and lipoproteins), algal sources, or crude vegetable oil. Lecithin may be used for a number of commercial purposes including as an emulsifier in food, as a nutritional supplement, and as a cosmetic additive. The amount of phospholipids in crude vegetable oil for various commodity oils is shown below in Table 1.

TABLE 1

Phospholipid content of various crude commodity oils.

| Oil | Phospholipids (wt %) |
| --- | --- |
| Soybean | 1-3 |
| Corn | 1-2 |
| Wheat | 0.08-2 |
| Cottonseed | 0.7-0.9 |
| Rice | 0.5 |
| Peanut | 0.3-0.4 |
| Canola | 1-2 |

The composition of lecithin from the crude oil may vary according to the source of phospholipid-containing oil, climate, geography, method of extraction (e.g., solvent or pressing) and the separation technique (e.g., acid or water degumming) with example phospholipid compositions being reported by Baldwin, "World Conference on Emerging Technologies in the Fats and Oils Industry," The American Oil Chemists Society (1986), page 161 and shown in Table 2.

TABLE 2

Phospholipid distribution in various crude sources.

| Phospholipid | Soybean (wt %) | Corn (wt %) | Sunflower (wt %) | Rapeseed (wt %) | Egg (wt %) | Bovine Brain (wt %) |
| --- | --- | --- | --- | --- | --- | --- |
| Phosphatidyl-choline | 21 | 31 | 14 | 37 | 69 | 18 |
| Phosphatidyl-ethanolamine | 22 | 3 | 24 | 29 | 24 | 36 |
| Phosphatidyl-inositol | 19 | 16 | 13 | 14 | — | 2 |
| Phosphatidic Acid | 10 | 9 | 7 | — | — | 2 |
| Phosphatidyl-serine | 1 | 1 | — | — | 3 | 18 |
| Sphingomyelin | — | — | — | — | 1 | 15 |
| Glycolipids | 12 | 30 | — | 20 | — | — |

Lecithin may be obtained by extracting a gum composition from raw oil and drying the composition. It should be noted that the term "gum" as used herein refers to the mixture of phospholipids, glycolipids, sugars, proteins, and other water soluble compounds that may be present in crude oil. The term "lecithin" as used herein refers to a product obtained after drying the gum that is extracted by water or dilute acid degumming of crude oils. This is in contrast to informal references in literature in which the terms "gum" and "lecithin" may be used interchangeably to describe the "sludge" found in crude vegetable oil. Other informal names for these materials may include "slim", "mucilaginous material", "sticky", "foots", and "phosphatides" or "phospholipids". See Farr et al., "Green Vegetable Oil Processing," Revised 1$^{st}$ Ed. (20134), page 108.

The phospholipids present in wet gums may be modified either chemically or enzymatically prior to or after drying. Chemical methods of modification may include, for example, acetylation, hydroxylation, hydrolysis, hydrogenation, halogenation, phosphorylation, and sulfonation. Enzymatic methods may include phospholipase forming lysolecithins or modified functional groups.

Drying causes the wet phospholipid gum composition to darken which may limit its use in white or light colored products. Wet gums are typically bleached with hydrogen peroxide. Hydrogen peroxide is very reactive as it is intrinsically oxidative. The reactive nature of hydrogen peroxide makes it difficult to store and handle and exposes those handling the hydrogen peroxide to safety risks.

A need exists for methods for bleaching phospholipid compositions without use of additional hydrogen peroxide and that result in phospholipid compositions with acceptable coloration.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a method for preparing a phospholipid product composition. The method includes providing a phospholipid-containing oil. Phospholipids are hydrated in the phospholipid-containing oil to produce a gum. The gum comprises lecithin. The gum is dried to produce a phospholipid composition comprising lecithin. The phospholipid composition is exposed to ultraviolet light to reduce the color of the phospholipid composition.

Another aspect of the present disclosure is directed to a method for bleaching a phospholipid composition. The method includes providing a phospholipid composition comprising from about 25 wt % to about 90 wt % lecithin on a dry basis. The phospholipid composition is exposed to ultraviolet light at a wavelength from about 190 nm to about 400 nm for at least about 0.5 hours.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Provisions of the present disclosure relate to methods for producing phospholipid compositions with reduced color. The compositions may be exposed to ultraviolet light to at least partially bleach the composition.

In this regard, as used herein the terms "lecithin", "lecithin composition", "phospholipid composition" or the like do not refer to a particular compound or particular group of phospholipids unless stated otherwise. Lecithin and the various compositions thereof may contain an amount of vegetable oil.

In some embodiments of the present disclosure, a phospholipid composition comprising lecithin is provided by extracting lecithin from a phospholipid-containing source such as egg yolks, animal membranes, algal sources, or crude vegetable oil. Oils and fats suitable for use in the lipid-containing composition include, for example and without limitation, canola oil, castor oil, coconut oil, coriander oil, corn oil, cottonseed oil, hazelnut oil, hempseed oil, linseed oil, meadowfoam oil, olive oil, palm oil, palm kernel oil, peanut oil, rapeseed oil, rice bran oil, safflower oil, sasanqua oil, soybean oil, sunflower seed oil, tall oil, tsubaki oil, varieties of "natural" oils having altered fatty acid compositions via Genetically Modified Organisms (GMO) or traditional "breeding" such as high oleic or low linolenic, low saturated oils (high oleic canola oil, low linolenic soybean oil or high stearic sunflower oils), and vegetable oil.

Figure 1:
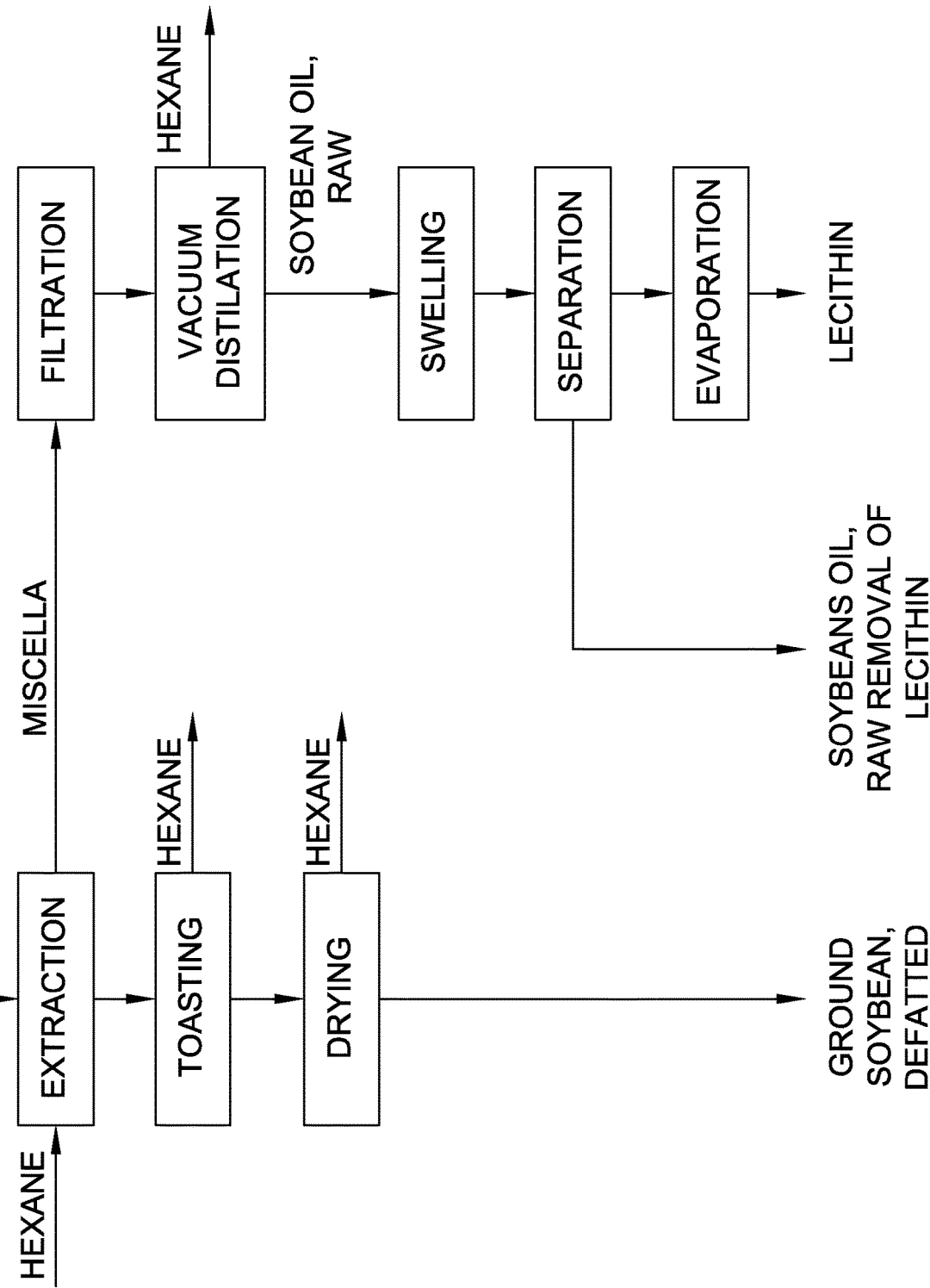
FIG. 1 is a flow diagram showing a process for producing a phospholipid composition with reduced color from soybeans.

Crude algal or vegetable oils may be obtained by mechanical separation (e.g., mechanical presses such as screw presses or the like) and/or by solvent extraction (e.g., hexane). An example method for removing oil from soybeans is shown in FIG. 1. Soybeans are cleaned, hulls removed by aspiration, cracked, and formed into flakes. The flaked soybeans are contacted with hexane to form miscella. The oil-deprived flakes are heated with steam to toast the flakes and strip hexane from the flakes. The flakes are dried and milled to form soybean meal. The miscella are filtered and vacuum distilled to strip hexane solvent.

It should be noted that the process for preparing the soybean oil is an example process and generally any method that produces a vegetable oil containing lecithin may be used unless stated otherwise.

In accordance with embodiments of the present disclosure, the crude vegetable oil (e.g., the crude soybean oil as shown in FIG. 1) is mixed with water to hydrate phospholipids in the oil (i.e., "swelling") and agglomerate the phospholipids to produce a gum comprising lecithin. In some embodiments, from about 1-5 wt % water is added to the crude oil to hydrate the phospholipids. The crude oil may be at a temperature of at least about 25° C. or at least about 60° C. (e.g., from about 25° C. to about 95° C.). The mixture may be agitated (e.g., 5 minutes to 2 hours or more) to allow the gum to hydrate and agglomerate or flocculate.

The wet gum is separated from the oil by centrifugation or decantation. Fluid additives (e.g., calcium chloride) may be added to the lecithin to lower its viscosity. Water is evaporated from the gum to produce a phospholipid composition (i.e., the gum is dried). Optionally, the oil in the phospholipid composition may be removed by extraction (e.g., with acetone or carbon dioxide) to produce a solid product composition of de-oiled phospholipids. In some embodiments, the composition contains about 25 wt % phospholipids on a dry basis, or about 30 wt %, about 35 wt %, about 40 wt %, about 45 wt %, about 50 wt %, about 55 wt %, about 60 wt %, about 65 wt %, about 70 wt %, about 75 wt %, about 80 wt %, or even about 85 wt % or more (e.g., from about 25 wt % to about 90 wt % phospholipids on a dry basis or from about 50 wt % to about 80 wt % or from about 60 wt % to about 75 wt % phospholipids on a dry basis).

The lecithin-containing gum may also include oil (e.g., neutral oils), such as about 10 wt % oil on a dry basis, or about 15 wt %, about 20 wt %, about 25 wt %, about 30 wt %, about 35 wt %, about 40 wt %, about 45 wt %, about 50 wt %, about 55 wt %, about 60 wt %, about 65 wt % or about 70 wt % or more oil on a dry basis (e.g., about 15 wt % to about 75 wt % oil on a dry basis or about 20 wt % to about 50 wt % oil on a dry basis). The gum may also include amounts of impurities such as carbohydrates, carotenoids, pigments (e.g., brown pigments) and porphyrins that may cause the phospholipid composition to darken in color upon heating. The gum may also contain water which may be subsequently removed from the gum (e.g., from about 25 wt % to about 75 wt % water on a total weight basis) to produce the lecithin-containing composition. After drying, the phospholipid composition may contain less than 1 wt % or even less than 0.5 wt % water on a total weight basis.

In some embodiments, an acid degumming process is used to produce and separate the lecithin-containing gum. Typically either citric acid or phosphoric acid is utilized in the acid degumming process. The acid may be added to the crude oil at a level of 250 to 2000 parts per million on a dry basis. The crude oil is mixed with the acid from 0.5 to 24 hours at a temperature from 25° C. to 85° C. One to three percent water by weight of the oil is added and the gums are allowed to hydrate from 0.5 to 2 hours. The wet gums are separated from the oil by either centrifugation or decanting.

In accordance with embodiments of the present disclosure, a phospholipid composition comprising lecithin is exposed to ultraviolet light to reduce the color of the phospholipid composition. Generally the composition exposed to ultraviolet light is a composition extracted from the gum (e.g., a product composition in which water and/or oil is removed from the composition). In some embodiments, the phospholipid composition extracted from the gum is diluted prior to exposing the composition to ultraviolet light. The phospholipid composition may be diluted with a solvent, oil, or any inert material. Example diluents include vegetable oil, petroleum ether, vegetable oil, and paraffin. The phospholipid composition may be mixed by use of mechanical impellers, high shear mixers, vortex stirring, or by one or more recirculation loops. In some embodiments, the ratio of diluent to phospholipid composition may be at least 1:4, at least 1:3, at least 1:2, at least 1:1, or at least 2:1 (e.g., from 1:4 to 3:1, from 1:3 to 2:1 or from 1:1 to 3:1). In other embodiments, the phospholipid composition is not diluted prior to exposure to ultraviolet light.

In some embodiments, the phospholipid composition is exposed to ultraviolet light at a wavelength from about 190 nm to about 400 nm or from about 190 nm to about 365 nm or from about 225 nm to about 365 nm. Alternatively or in addition, the peak wavelength at which light is emitted may be about 254 nm. In some embodiments, the phospholipid composition is exposed to UV-B ultraviolet light (e.g., from about 250 nm to about 300 nm) and/or UV-C ultraviolet light (e.g., from about 300 nm to about 380 nm). The composition may be exposed to ultraviolet light for at least 0.25 hours, at least 0.5 hours, at least about 1 hour, at least about 2.5 hours, at least about 5 hours or at least about 8 hours (e.g., 0.5 hours to 74 hours, 0.5 hours to 12 hours or 0.5 hours to 8 hours). In some embodiments, a low pressure amalgam lamp (e.g., 15 watt) is used to expose the phospholipid composition to ultraviolet light. The lamp may be a mercury lamp (e.g., low or medium pressure mercury lamp) or may be a light-emitting diode (LED).

The phospholipid composition may be heated before exposure to ultraviolet light to reduce the viscosity of the composition to reduce system pressure (e.g., to improve the safety of the system) and to improve pumping of the composition. For example, the composition may be heated to a temperature of at least about 20° C., 30° C., 40° C., or 50° C. (e.g., to a temperature from about 20° C. to about 100° C., about 30° C. to about 80° C. or about 30° C. to about 70° C.). The phospholipid composition may be heated indirectly (e.g., jacketed vessels or heat exchange plates) or directly (e.g., heating elements or steam heating). The temperature of the composition during heating and exposure to ultraviolet light may be maintained below 80° C. (or even below 70° C.) to reduce or prevent darkening of the phospholipid composition.

The phospholipid composition may be exposed to ultraviolet light by use of high intensity UV emission lamps. In some embodiments, the high intensity lamp has an emission range between 190 nm and 400 nm with less than 10%, 5% or 1% of the emissions being outside this range. The lamp may emit ultraviolet light at a peak wavelength of 254 nm and/or at 368 nm.

Figure 2:
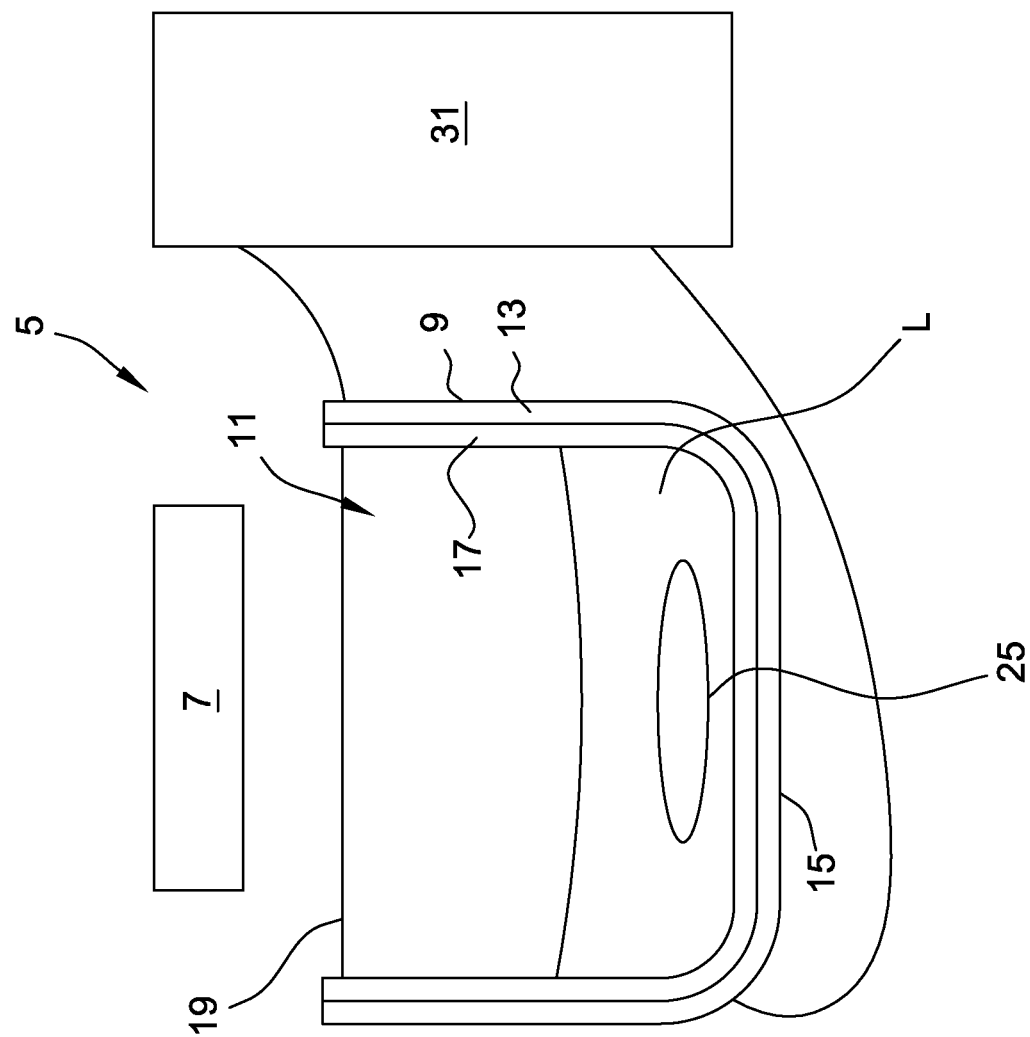
FIG. 2 is a schematic of a thin film light reactor in which a phospholipid composition is exposed to ultraviolet light.

The heated composition may be pumped to a thin film light reactor where the lecithin is exposed to the high intensity lamp. In some embodiments, the thickness of the film is from about 1 mm to about 30 mm. Referring now to FIG. 2, a thin film light reactor is referred to generally as "5". The reactor 5 includes an ultraviolet light source 7 disposed above the lecithin-containing phospholipid composition L. The reactor 5 includes sidewall(s) 9 and a reactor bottom 15 that form a chamber 11 to hold the composition L. The reactor 5 may include a cover 19 that is substantially transparent to ultraviolet light such as glass, sapphire or quartz.

The reactor sidewall 9 should be chosen to provide sufficient reflectivity and to be relatively thermally stable in heated environments (e.g., up to 70°, 85°, or up to 100° C.). The sidewall 9 may also be relatively thermally insulating. In some embodiments, the sidewall 9 is multilayer in order to provide a chamber to the thermal fluid flow. The sidewall 9 may include an outer layer 13 that is thermally stable and insulating. The inner layer 17 may be reflective such as, for example, stainless steel (e.g., electro-polished steel) and aluminum or alloys thereof to allow ultraviolet light to be reflected back toward the composition L. In other embodiments, the inner layer 17 may be transparent to allow ultraviolet light to pass to a reflective outer layer 13 to allow light to be reflected back toward the lecithin-containing phospholipid composition "L". The inner layer 17 should be non-reactive when exposed to lecithin-containing environments (e.g., quartz). The bottom 15 of the reactor 5 may have a similar or the same construction as the sidewall 9 (e.g., two-layer construction) and may be integral with the sidewall 9. The portions of the reactor 5 that form the chamber 11 in which the composition L is held (e.g., sidewall 9, bottom 15 and cover 19) may have a thickness selected to withstand the system pressure. The reactor 5 and other apparatus which may contact the phospholipid composition (e.g., heat exchangers, transfer conduits, and the like) may be made of food-grade materials.

The reactor 5 includes an agitator system 25 (e.g., magnetic stirrer as shown) that agitates the phospholipid composition L to allow the mixture to be more uniformly exposed to ultraviolet light and efficiently transfer and control the temperature of lecithin. A temperature control system 31 heats a thermal fluid (e.g., water, glycerin, brine, thermal fluids, etc.) that heats the sidewall 9 and bottom 15 to consequently heat the phospholipid composition "L" and maintain its temperature during exposure to ultraviolet light.

In some embodiments, after exposure to ultraviolet light, the phospholipid composition is cooled (e.g., by use of a shell and tube exchanger or plate exchanger). The composition may be cooled to less than 60° C., less than 40° C. or less than 20° C.

It should be understood that while phospholipid compositions may be exposed to ultraviolet light in a batch reactor such as the reactor 5 shown in FIG. 2, in other embodiments continuous reactors in which phospholipid compositions are semi-continuously or continuously cycled through the reactor may be used. Such continuous reactors may include continuous mixing devices, temperature and flow controls, and/or safety locks (e.g., for high pressure and to detect glass breakage).

Figure 3:
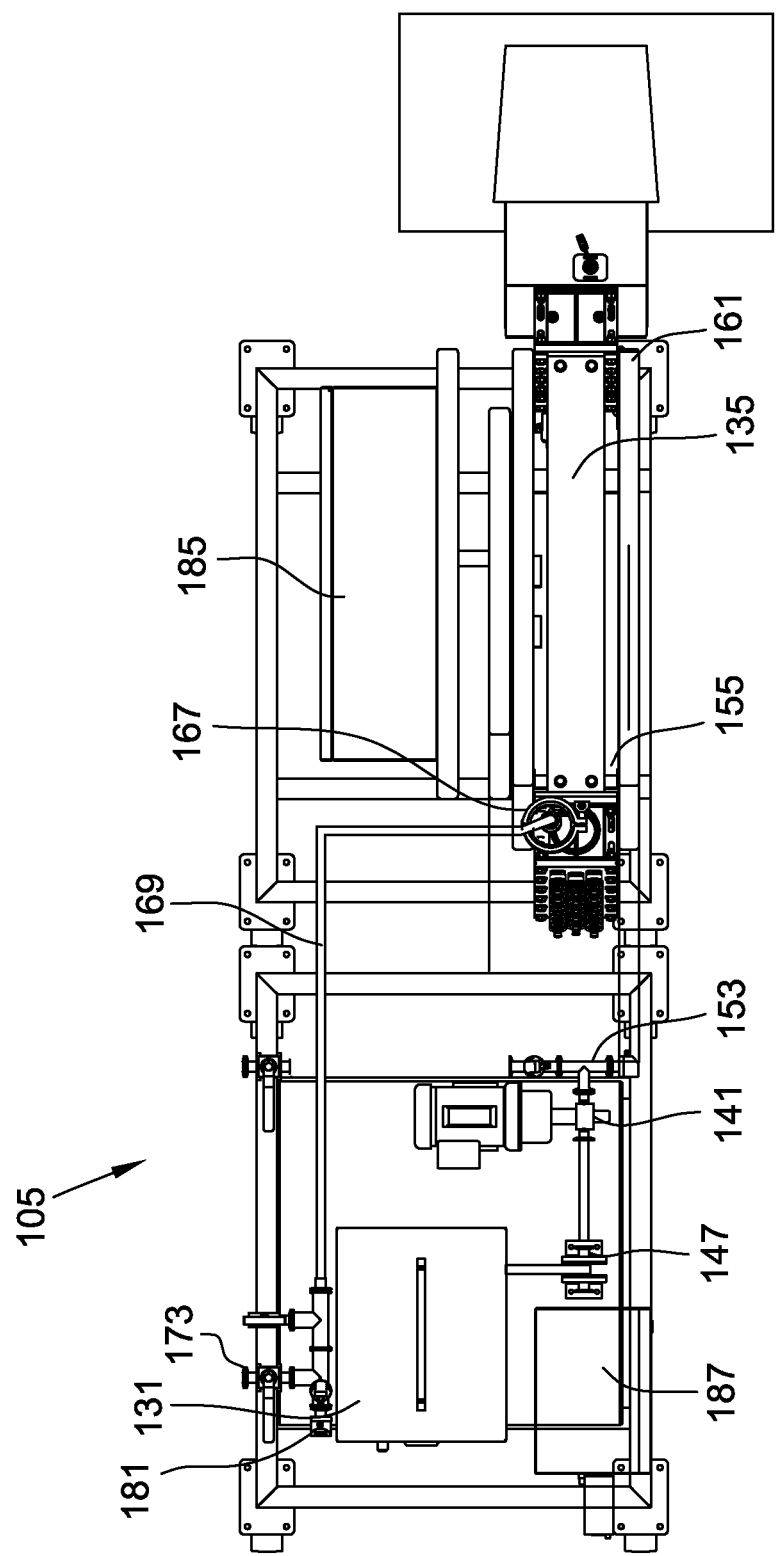
FIG. 3 is a top view of a reactor system for continuous circulation of a phospholipid composition through an ultraviolet light reactor.

An example continuous reactor system 105 is shown in FIG. 3. The continuous reactor system 105 includes a reservoir 131 for holding a phospholipid composition (e.g., at least 1 kg, at least 10 kg, at least 50 kg or at least 100 kg of phospholipid composition) such as a stainless steel tank. The phospholipid composition may be continuously cycled from the reservoir 131, through a light reactor 135 and back to the reservoir 131. The system includes a pump 141 for circulating the composition from the reservoir 131 and through the reactor 135. A flow meter 147 detects the flow rate of the phospholipid composition that is cycled through the reactor 135. In some embodiments, the system 105 is configured to circulate at least 0.1 gallons per minute of phospholipid composition through the light reactor 135 or at least 0.5 gallons per minute, at least 1 gallon per minute, at least 2.5 gallon per minute or at least 10 gallons per minute of phospholipid composition through the reactor 135.

The phospholipid composition may be heated to the desired temperature in the reservoir 131 or in the recirculation loop (e.g., by use of heating elements). A temperature sensor 153 measures the temperature of the composition before entering the reactor 135. The composition passes through an inlet conduit 155, through reactor inlet 161 and through the light reactor 135 where it is exposed to ultraviolet light. The light source may include a series of ultraviolet lamps (e.g., at least 1, at least 5, at least 10, or at least 25 or more lamps). The phospholipid composition is discharged through a reactor outlet 167 and passes through a discharge conduit 169. The composition passes through a sample/discharge valve 173 and returns to the reservoir 131 through a reservoir return inlet 181. The system 105 may be controlled by a reactor control panel 185 and skid control panel 187. The continuous reactor system 105 may be automated to control the composition flow rate, temperature, recirculation time, and/or the reactor light power.

Figure 4:
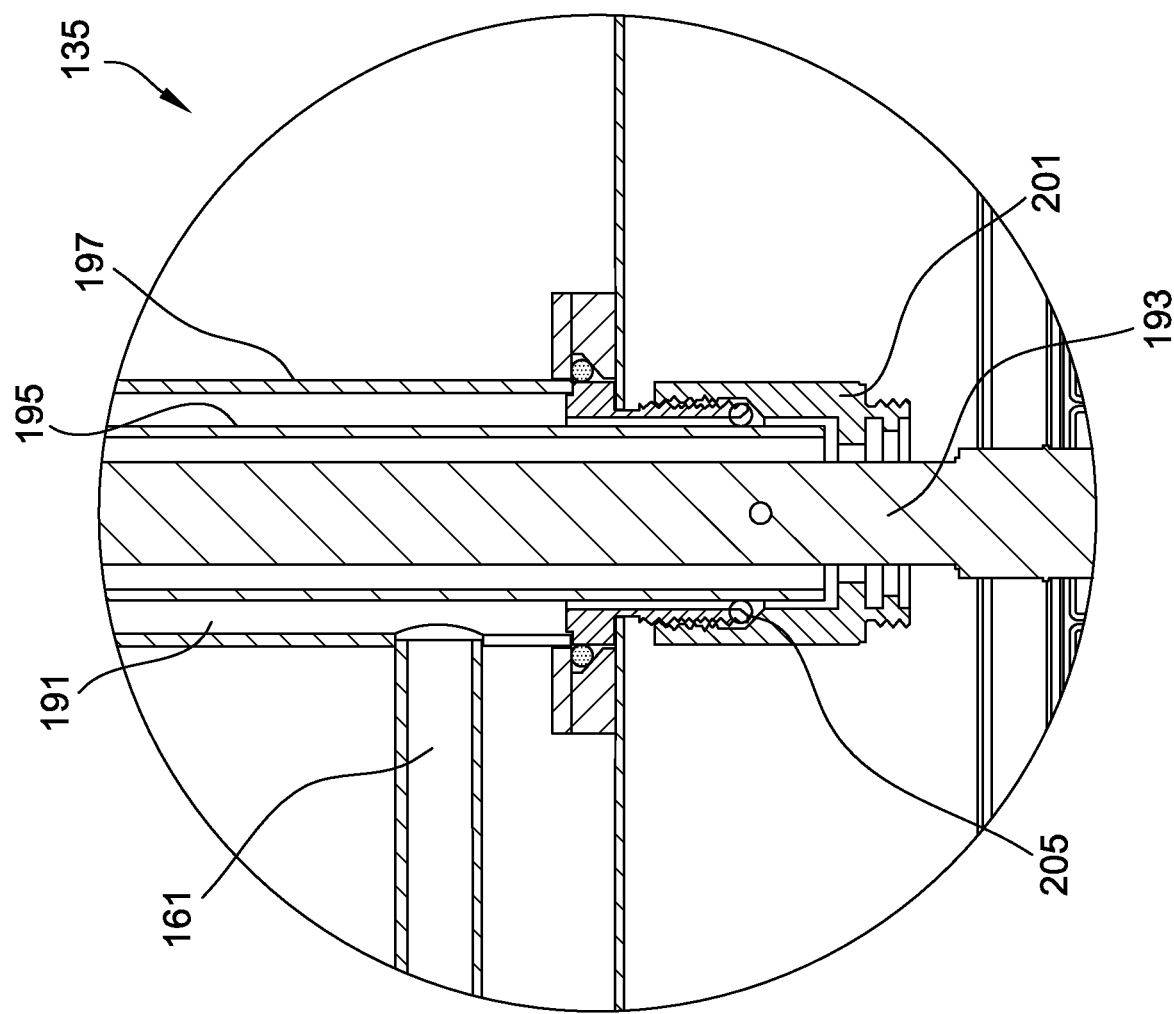
FIG. 4 is a top view of a continuous thin-film light reactor for exposing a phospholipid composition to ultraviolet light.

Referring now to FIG. 4, an example thin film reactor 135 for use in the continuous reactor system 105 of FIG. 3 is shown. The reactor 135 includes a transparent inner wall 195 (e.g., quartz) and a reflective wall 197 that form a flow channel 191. The inner wall 195 may be secured by a wall mount 201 and sealed by an o-ring 205. The phospholipid composition passes through the inlet 161 and flows through the flow channel 191 and over the transparent inner wall 195. An ultraviolet light source 193 is powered to expose the composition to ultraviolet light. Ultraviolet light passes through the transparent inner wall 195 and into the phospholipid composition flowing through the channel 191. Ultraviolet light may be reflected back into the composition by the reflective wall 197.

In accordance with some embodiments of the present disclosure, the phospholipid composition is produced and bleached without contact with hydrogen peroxide and/or other bleaching and/or oxidizing agents (e.g., benzoyl peroxide). In other embodiments, both bleaching by contact with a bleaching agent (e.g., contact with an oxidizing agent such as hydrogen peroxide) and ultraviolet bleaching are used to lighten the color of the phospholipid composition (e.g., when a peroxide bleached product has not met a color specification).

Exposure to ultraviolet light reduces the color of the phospholipid composition. Color may be measured by any method available to those of skill in the art. The Gardner color scale may be used to measure the color of the phospholipid composition. The Gardner color may be measured in accordance with ASTM D1544-04 (2010) entitled "Standard Test Method for Color of Transparent Liquids (Gardner Color Scale)", which is incorporated herein by reference for all relevant and consistent purposes. The Gardner scale ranges from 1-18 with 1 being light yellow and 18 being dark brown.

In some embodiments, the color of the dried phospholipid composition is reduced to below 16 on the Gardner scale or to below about 15 on the Gardner scale by exposure of the phospholipid composition to ultraviolet light. Exposure to ultraviolet light (e.g., for about 0.5 hours or more) may reduce the color of the composition on the Gardner scale by 1 Gardner scale point or by 1.5 or even 2 Gardner scale points. Exposure to ultraviolet light (e.g., for about 0.5 hours or more) may reduce the color on the Gardner scale by 5%, 10% or even 15% or more.

In embodiments in which the phospholipid composition is bleached prior to drying, the bleached composition may be dried to remove moisture from the composition (e.g., to a moisture content of 5 wt %, 3 wt % or 1 wt % or less). Drying may be performed under vacuum in a continuous thin film drier or a batch drier. The phospholipid composition may be refined by removal of oil from the composition.

In some embodiments, the phospholipid composition is centrifuged to concentrate the composition. For example, the composition may be concentrated by a centrifuge that operates at a rate of at least 500 rpm, at least 1000 rpm, at least 3000 rpm or at least 4000 rpm (e.g., from about 500 rpm to 11,000 rpm, from about 1000 rpm to about 11,000 rpm or from about 500 rpm to about 5000 rpm). The centrifuged phospholipid composition may contain at least 35 wt % phospholipids, at least 50% phospholipids or at least 55% phospholipids. In some embodiments, the temperature of the composition during centrifugation is between 10° C. to 60° C. (e.g., the composition is cooled prior to centrifugation). The centrifugation system may also include a by-pass to allow a portion of the diluted composition to mix with the centrifuged composition (e.g., to achieve a quality target).

It should be noted that, unless stated otherwise, generally any combination of the process steps described above (e.g., initial heating, dilution, ultraviolet exposure, cooling, and concentration such as by centrifugation) may be used to reduce the color of the phospholipid composition. In some embodiments, the color of the phospholipid composition is reduced by a series of steps that include each of initial heating, dilution, exposure to ultraviolet light, cooling, and concentration. For example, after extraction, the phospholipid composition is heated to at least 60° C., the phospholipid composition is diluted to a mass ratio of diluent to phospholipid of at least 1:1 (with the dilution optionally being performed prior to the heating step. The phospholipid composition is then exposed to ultraviolet light at a wavelength from about 190 nm to about 400 nm for at least about 0.5 hours. The composition is then cooled to less than 60° C. and the resulting composition is concentrated such as by centrifugation.

EXAMPLES

The processes of the present disclosure are further illustrated by the following Examples. These Examples should not be viewed in a limiting sense.

Example 1

Lab-Scale Bleaching of a Phospholipid Composition by Exposure to Ultraviolet Light with Petroleum Ether Diluent A phospholipid composition comprising lecithin (100 g) was mixed with petroleum ether (100 g) to reduce the viscosity and optical density of the composition. The composition was transferred to a jacketed stainless steel reactor shown schematically in FIG. 2 (14 cm diameter and 300 ml capacity) and placed below an ultraviolet lamp for 30 hours with magnetic stirring at ambient temperature. The lamp employed was a 15 watt compact fluorescent light (15/UV/MED Compact Germicidal Bulb P/N 100304322). Petroleum ether was added every 2 hours to counter petroleum ether evaporation.

After 30 hours, the petroleum ether was evaporated and the Gardner color was measured (PFX-995i Series Colour Measurement Instrument from LOVIBOND (Amesbury, England)). The initial Gardner color of the dried composition was 16.6 and the final Gardner color was 14.2 (14.5% color reduction).

Example 2

Lab-Scale Bleaching of a Phospholipid Composition by Exposure to Ultraviolet Light with Paraffin Diluent A phospholipid composition comprising lecithin (50 g) was mixed with liquid paraffin (50 g) to reduce the viscosity and optical density of the composition. The composition was transferred to a jacketed stainless steel reactor shown schematically in FIG. 2 (14 cm diameter and 300 ml capacity) and placed below an ultraviolet lamp for 72 hours with magnetic stirring at 60° C. The lamp employed was a 15 watt compact fluorescent light (15/UV/MED Compact Germicidal Bulb P/N 100304322).

After 72 hours, the Gardner color was measured (LOVIBOND PFX-995i Series Colour Measurement Instrument). The initial Gardner color of the composition was 16.7 and the final Gardner color was 13.3 (20.4% color reduction).

Example 3

Lab-Scale Bleaching of a Phospholipid Composition by Exposure to Ultraviolet Light with Paraffin Diluent and Nitrogen Purge A phospholipid composition comprising lecithin (50 g) was mixed with liquid paraffin (50 g) to reduce the viscosity and optical density of the composition. The composition was transferred to a jacketed stainless steel reactor shown schematically in FIG. 2 (14 cm diameter and 300 ml capacity) and placed below an ultraviolet lamp for 72 hours with magnetic stirring at 60° C. with nitrogen purge to avoid oxidation of the composition. The lamp employed was a 15 watt compact fluorescent light (15/UV/MED Compact Germicidal Bulb P/N 100304322).

After 72 hours, the Gardner color was measured (LOVIBOND PFX-995i Series Colour Measurement Instrument). The initial Gardner color of the composition was 16.5 and the final Gardner color was 13 (21.2% color reduction).

Example 4

Lab-Scale Bleaching of a Phospholipid Composition by Exposure to Ultraviolet Light with Soybean Oil Diluent (3:2 Ratio)

A phospholipid composition comprising soybean lecithin (60 g) was mixed with refined soybean oil (40 g) to reduce the viscosity and optical density of the composition. The composition was transferred to a jacketed stainless steel reactor shown schematically in FIG. 2 (14 cm diameter and 300 mL capacity) and placed below an ultraviolet lamp for 48 hours with magnetic stirring at 60° C. with a nitrogen purge to avoid oxidation of the composition. The lamp employed was a 15 watt compact fluorescent light (15/UV/MED Compact Germicidal Bulb P/N100304322).

After 72 hours, the Gardner color was measured (LOVIBOND PFX-995i Series Colour Measurement Instrument). The initial Gardner color of the composition was 16.5 and the final Gardner color was 15.2 (8% color reduction).

Example 5

Lab-Scale Bleaching of a Phospholipid Composition by Exposure to Ultraviolet Light with Soybean Oil Diluent (1:1 Ratio)

A phospholipid composition comprising soybean lecithin (50 g) was mixed with refined soybean oil (50 g) to reduce the viscosity and optical density of the composition. The composition was transferred to a jacketed stainless steel reactor shown schematically in FIG. 2 (14 cm diameter and 300 mL capacity) and placed below an ultraviolet lamp for 48 hours with magnetic stirring at 60° C. with a nitrogen purge to avoid oxidation of the composition. The lamp employed was a 15 watt compact fluorescent light (15/UV/MED Compact Germicidal Bulb P/N100304322).

After 72 hours, the Gardner color was measured (LOVIBOND PFX-995i Series Colour Measurement Instrument). The initial Gardner color of the composition was 16.0 and the final Gardner color was 14.7 (8% color reduction).

Example 6

Lab-Scale Bleaching of a Phospholipid Composition by Exposure to Ultraviolet Light with Canola Oil Diluent A phospholipid composition comprising soybean lecithin (70 g) was mixed with refined canola oil (30 g) to reduce the viscosity and optical density of the composition. The composition was transferred to a jacketed stainless steel reactor shown schematically in FIG. 2 (14 cm diameter and 300 ml capacity) and placed below an ultraviolet lamp for 48 hours with magnetic stirring at 60° C. with a nitrogen purge to avoid oxidation of the composition. The lamp employed was a 15 watt compact fluorescent light (15/UV/MED Compact Germicidal Bulb P/N100304322).

After 72 hours, the Gardner color was measured (LOVI-BOND PFX-995i Series Colour Measurement Instrument). The initial Gardner color of the composition was 17.1 and the final Gardner color was 16.5 (4% color reduction).

Example 7

Lab-Scale Bleaching of a Phospholipid Composition by Exposure to Ultraviolet Light with Sunflower Oil Diluent A phospholipid composition comprising sunflower lecithin (100 g) was mixed with refined sunflower oil (50 g) to reduce the viscosity and optical density of the composition. The composition was transferred to a jacketed stainless steel reactor shown schematically in FIG. 2 (14 cm diameter and 300 ml capacity) and placed below an ultraviolet lamp for 48 hours with magnetic stirring at 60° C. with a nitrogen purge to avoid oxidation of the composition. The lamp employed was a 15 watt compact fluorescent light (15/UV/MED Compact Germicidal Bulb P/N100304322).

After 72 hours, the Gardner color was measured (LOVI-BOND PFX-995i Series Colour Measurement Instrument). The initial Gardner color of the composition was 17.5 and the final Gardner color was 15.8 (10% color reduction).

Example 8

Continuous Pilot-Scale Bleaching of a Phospholipid Composition by Exposure to Ultraviolet Light with Sunflower Oil Diluent (26 Hours)

A phospholipid composition comprising sunflower lecithin (36.6 kg) was mixed with refined sunflower oil (18.3 kg) to reduce the viscosity and optical density of the composition. The composition was transferred to the reactor system shown in FIG. 3. The reactor system included a stainless steel tank (60 kg capacity) and two heating elements (each 300 W). After heating to 60° C., the phospholipid composition was circulated through the ultraviolet light reactor (32 gold grade ultraviolet lamps (240 W)).

After circulating the composition through the light reactor for 26 hours, the Gardner color was measured (LOVIBOND PFX-995i Series Colour Measurement Instrument) with hexane dilution (1:10). The initial Gardner color of the composition was 6.4 and the final Gardner color was 5.9 (8% color reduction).

Example 9

Continuous Pilot-Scale Bleaching of a Phospholipid Composition by Exposure to Ultraviolet Light with Sunflower Oil Diluent (10 Hours)

The pilot-scale process of Example 8 was repeated with the composition being recirculated through the light reactor for 10 hours. The initial Gardner color of the composition was 6.4 and the final Gardner color was 6.0 (6% color reduction).

Example 10

Continuous Pilot-Scale Bleaching of a Phospholipid Composition by Exposure to Ultraviolet Light with Canola Oil Diluent A phospholipid composition comprising canola lecithin (36.6 kg) was mixed with refined canola oil (18.3 kg) to reduce the viscosity and optical density of the composition. The composition was transferred to the reactor system shown in FIG. 3. The reactor system included a stainless steel tank (60 kg capacity) and two heating elements (each 300 W). After heating to 60° C., the phospholipid composition was circulated through the ultraviolet light reactor (32 gold grade ultraviolet lamps (240 W)).

After circulating the composition through the light reactor for 10 hours, the Gardner color was measured (LOVIBOND PFX-995i Series Colour Measurement Instrument) with hexane dilution (1:10). The initial Gardner color of the composition was 10.9 and the final Gardner color was 10.8 (1% color reduction).

Example 11

Continuous Pilot-Scale Bleaching of a Phospholipid Composition by Exposure to Ultraviolet Light with Soybean Oil Diluent A phospholipid composition comprising soybean lecithin (36.6 kg) was mixed with refined soybean oil (18.3 kg) to reduce the viscosity and optical density of the composition. The composition was transferred to the reactor system shown in FIG. 3. The reactor system included a stainless steel tank (60 kg capacity) and two heating elements (each 300 W). After heating to 60° C., the phospholipid composition was circulated through the ultraviolet light reactor (32 gold grade ultraviolet lamps (240 W)).

After circulating the composition through the light reactor for 10 hours, the Gardner color was measured (LOVIBOND PFX-995i Series Colour Measurement Instrument) with hexane dilution (1:10). The initial Gardner color of the composition was 7.7 and the final Gardner color was 7.2 (6% color reduction).

Example 12

Continuous Pilot-Scale Bleaching of a Phospholipid Composition by Exposure to Ultraviolet Light with Canola Diluent and with Re-Concentration The pilot-scale process of Example 10 was repeated with the composition being recirculated through the light reactor for 10 hours. The product composition was centrifuged to remove dilution oil to concentrate the composition[1]. Centrifugation was performed at 4000 rpm. The composition was successfully concentrated at 20° C., 40° C. and 60° C. Centrifugation increased the acetone insoluble residue from 42.7% to 51.7%.

The Gardner color was measured (LOVIBOND PFX-995i Series Colour Measurement Instrument) with hexane dilution (1:10). The Gardner color of the starting concentrated material was 12.0 and the Gardner color of the final concentrated material was 11.7 (3% color reduction).

Example 13: Continuous Pilot-Scale Bleaching of a Phospholipid Composition by Exposure to Ultraviolet Light with Canola Diluent and with Re-Concentration The pilot-scale process of Example 11 was repeated with the composition being recirculated through the light reactor for 10 hours. The product composition was centrifuged to remove dilution oil to concentrate the composition. Centrifugation was performed at 4000 rpm. The composition was successfully concentrated at 20° C., 40° C. and 60° C. Centrifugation increased the acetone insoluble residue from 36.7% to 50.9%.

The Gardner color was measured (LOVIBOND PFX-995i Series Colour Measurement Instrument) with hexane dilution (1:10). The Gardner color of the starting concentrated material was 9.0 and the Gardner color of the final concentrated material was 8.1 (10% color reduction). Gardner color measurement without hexane dilution (1:10) resulted in a color reduction from 17.6 to 16.0 (10% color reduction).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A method for preparing a phospholipid composition comprising:
   providing a phospholipid-containing oil;
   hydrating phospholipids in the phospholipid-containing oil to produce a gum, the gum comprising lecithin;
   drying the gum to produce a phospholipid composition comprising lecithin; and
   exposing the phospholipid composition to ultraviolet light to reduce the color of the phospholipid composition, wherein exposing the phospholipid composition to ultraviolet light comprises continuously pumping the phospholipid composition into a reactor and continuously discharging the phospholipid composition from the reactor, the phospholipid composition being exposed to ultraviolet light at a wavelength from 190 nm to 400 nm in the reactor.

2. The method as set forth in claim 1 further comprising separating the gum from the phospholipid-containing oil.

3. The method as set forth in claim 1 wherein the phospholipid composition is exposed to ultraviolet light at a wavelength from 190 nm to 400 nm for at least 0.5 hours.

4. The method as set forth in claim 1 wherein the phospholipid composition is exposed to ultraviolet light at a wavelength of 254 nm for at least 0.5 hours.

5. The method as set forth in claim 1 wherein the phospholipid containing oil is obtained from a vegetable, algae, animal, or egg.

6. The method as set forth in claim 1 wherein exposing the phospholipid composition to ultraviolet light reduces the color by 1.5 points on the Gardner scale.

7. The method as set forth in claim 1 wherein the phospholipid-containing oil, the gum, and the phospholipid composition are not contacted with hydrogen peroxide or other oxidizing agent.

8. The method as set forth in claim 1 wherein at least one of the phospholipid-containing oil, the gum, and the phospholipid composition are reacted with hydrogen peroxide or other oxidizing agent.

9. The method as set forth in claim 1 further comprising diluting the phospholipid composition prior to exposing the composition to ultraviolet light.

10. The method as set forth in claim 9 further comprising heating the phospholipid composition prior to exposing the composition to ultraviolet light.

11. The method as set forth in claim 10 further comprising:
    cooling the phospholipid composition after exposing the composition to ultraviolet light; and
    concentrating the phospholipid composition after exposing the composition to ultraviolet light.

12. A method for bleaching a phospholipid composition comprising:
    providing a phospholipid composition comprising from 50 wt % to 80 wt % lecithin on a dry basis; and
    exposing the phospholipid composition to ultraviolet light at a wavelength from 190 nm to 400 nm for at least 0.5 hours.

13. The method as set forth in claim 12 wherein the phospholipid composition is a gum extracted from a phospholipid-containing crude oil.

14. The method as set forth in claim 12 wherein the phospholipid composition is exposed to ultraviolet light at a wavelength of 254 nm for at least 0.5 hours.

15. The method as set forth in claim 12 wherein exposing the phospholipid composition to ultraviolet light reduces the color by 1.5 points on the Gardner scale.

16. The method as set forth in claim 12 wherein the phospholipid composition is not contacted with hydrogen peroxide or other oxidizing agent before being exposed to ultraviolet light.

17. The method as set forth in claim 12 wherein the phospholipid composition is not contacted with hydrogen peroxide or other oxidizing agent after being exposed to ultraviolet light.

18. The method as set forth in claim 12 wherein the phospholipid composition is contacted with hydrogen peroxide before being exposed to ultraviolet light.

19. The method as set forth in claim 12 wherein the phospholipid composition is contacted with hydrogen peroxide after being exposed to ultraviolet light.

20. The method as set forth in claim 12 comprising continuously pumping the phospholipid composition into a reactor and continuously discharging the phospholipid composition from the reactor, the phospholipid composition being exposed to ultraviolet light at a wavelength from 190 nm to 400 nm in the reactor.

* * * * *